United States Patent [19]
Damas

[11] Patent Number: 4,660,432
[45] Date of Patent: Apr. 28, 1987

[54] DEVICE FOR AUTOMATICALLY TAKING UP BACKLASH IN GEAR TRANSMISSION SYSTEMS

[76] Inventor: James Damas, 13, La Lisierre du Golf, 92380 Garches, France

[21] Appl. No.: 809,690

[22] Filed: Dec. 16, 1985

[51] Int. Cl.$^4$ .......................... F16H 55/18; F16H 3/58
[52] U.S. Cl. ........................................ 74/440; 74/409; 464/85
[58] Field of Search ................... 74/409, 440; 464/85

[56] References Cited

U.S. PATENT DOCUMENTS

| | | | |
|---|---|---|---|
| 1,317,232 | 9/1919 | Spillman | 74/440 |
| 1,804,906 | 5/1931 | Wemp | 74/443 |
| 2,845,809 | 8/1958 | Hetzel | 74/440 |
| 3,127,784 | 4/1964 | O'Neil | 74/440 |
| 3,361,002 | 1/1968 | Staehlin | 74/409 |

FOREIGN PATENT DOCUMENTS

| | | | |
|---|---|---|---|
| 2528466 | 1/1977 | Fed. Rep. of Germany | 74/440 |
| 560469 | 4/1944 | United Kingdom | 74/440 |
| 872872 | 10/1981 | U.S.S.R. | 74/409 |
| 1016598 | 5/1983 | U.S.S.R. | 74/409 |

*Primary Examiner*—Allan D. Herrmann
*Attorney, Agent, or Firm*—Sughrue, Mion, Zinn, Macpeak & Seas

[57] ABSTRACT

A driving gear wheel (2) meshes with a driven gear wheel (6) which is fixed to rotate on a shaft (5) and is associated with two toothed wheels (8 and 10) situated on either side thereof. The toothed wheels are connected to the gear wheel (6) by resilient tabs (13 and 13') which are pre-stressed so as to provide opposite angular offsets between the gear wheel (6) and the toothed wheels (8 and 10). This type of device is applicable, in particular, to stepdown gear drives for use in robotics.

7 Claims, 8 Drawing Figures

DEVICE FOR AUTOMATICALLY TAKING UP BACKLASH IN GEAR TRANSMISSION SYSTEMS

The invention relates to gear transmission systems, and more particularly to automatically taking up backlash, in the operation of such transmission systems.

BACKGROUND OF THE INVENTION

Although the invention is not limited to this particular application, it is especially useful in step-down gearing including a primary or drive shaft which rotates together with at least one gear wheel which meshes with a driven gear wheel of a secondary or driven shaft. In operation of this type of device, there exists a degree of backlash between the teeth, thereby leading to a loss of accuracy in the positioning of the driven shaft. Further, the backlash increases over a period of time due to wear, and this can give rise to improper operation.

Devices exist, such as that described in U.S. Pat. No. 1,804,906, for compensating such backlash by ensuring that all the slack occurs on one side only for rotation in one direction, which in effect means that the backlash is not taken up at all.

Preferred implementations of the present invention provide a method and apparatus for automatically taking up backlash in gear transmission systems, said method and apparatus being simple in design, easy to implement, and operating regardless of the direction in which the gearing rotates.

SUMMARY OF THE INVENTION

The present invention provides a device for automatically taking up backlash in a gear transmission including at least one drive shaft and at least one driven shaft which are interconnected by first and second meshing gear wheels, the device comprising first and second toothed wheels mounted on either side of said first meshing gear wheel, on the same shaft as said first meshing gear wheel, and having the same diameter and the same number of teeth as said first gear wheel in order to mesh with said second gear wheel, said first and second toothed wheels being free to rotate about said shaft and each toothed wheel being connected to said first gear wheel by respective resilient coupling means extending parallel to said shaft, said resilient coupling means being so disposed that when the teeth of said toothed wheels and said first gear wheel are substantially aligned for meshing with said second gear wheel, one of said toothed wheels is resiliently urged clockwise and the other of said toothed wheels is resiliently urged anti-clockwise about said shaft and relative to said gear wheel, and when the teeth are not meshed and said resilient couplings are allowed to relax, said toothed wheels are angularly offset in opposite directions relative to said first gear wheel.

BRIEF DESCRIPTION OF THE DRAWINGS

Embodiments of the invention are described by way of example with reference to the accompanying drawings, in which.

MORE DETAILED DESCRIPTION

Figure 1:
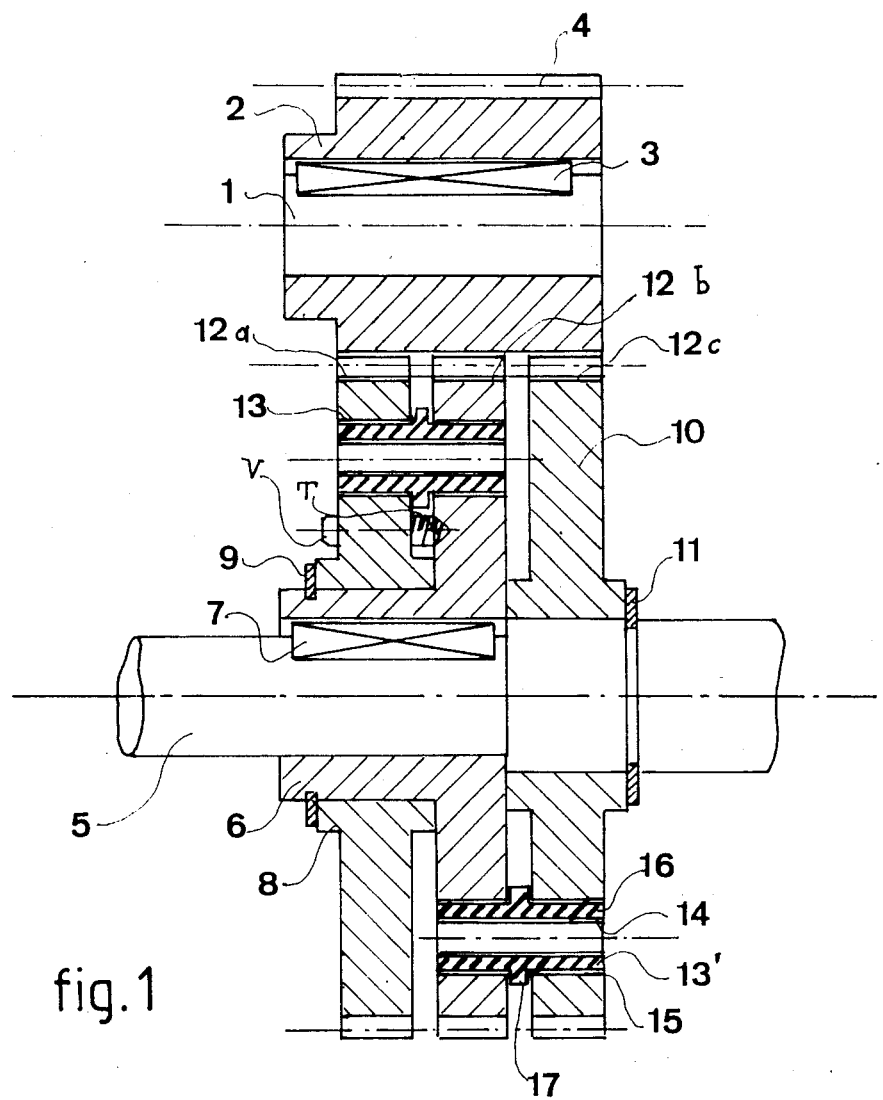
FIG. 1 is an axial section through a first device in accordance with the invention for automatically taking up backlash.

In FIG. 1, a drive shaft 1 has a key 3 connecting it to a gear wheel 2 whose teeth are shown symbolically at 4. The gear wheel 2 is intended to drive a driven shaft 5 with a predetermined stepdown ratio.

The device in accordance with the invention concerns a gear wheel 6 which is fixed to the driven shaft 5 by a key 7 and which has first and second two toothed wheels 8 and 10 disposed on either side thereof, said toothed wheels being of the same diameter and having the same number of teeth as the gear wheel 6. The toothed wheel 8 is mounted on a sleeve 9 on the gear wheel 6 and is free to rotate relative thereto. A stop ring 9 prevents the toothed wheel 8 from moving axially. Similarly, the toothed wheel 10 is mounted free to rotate about the shaft 5, and is prevented from moving axially by means of a stop ring 11.

Figure 2:
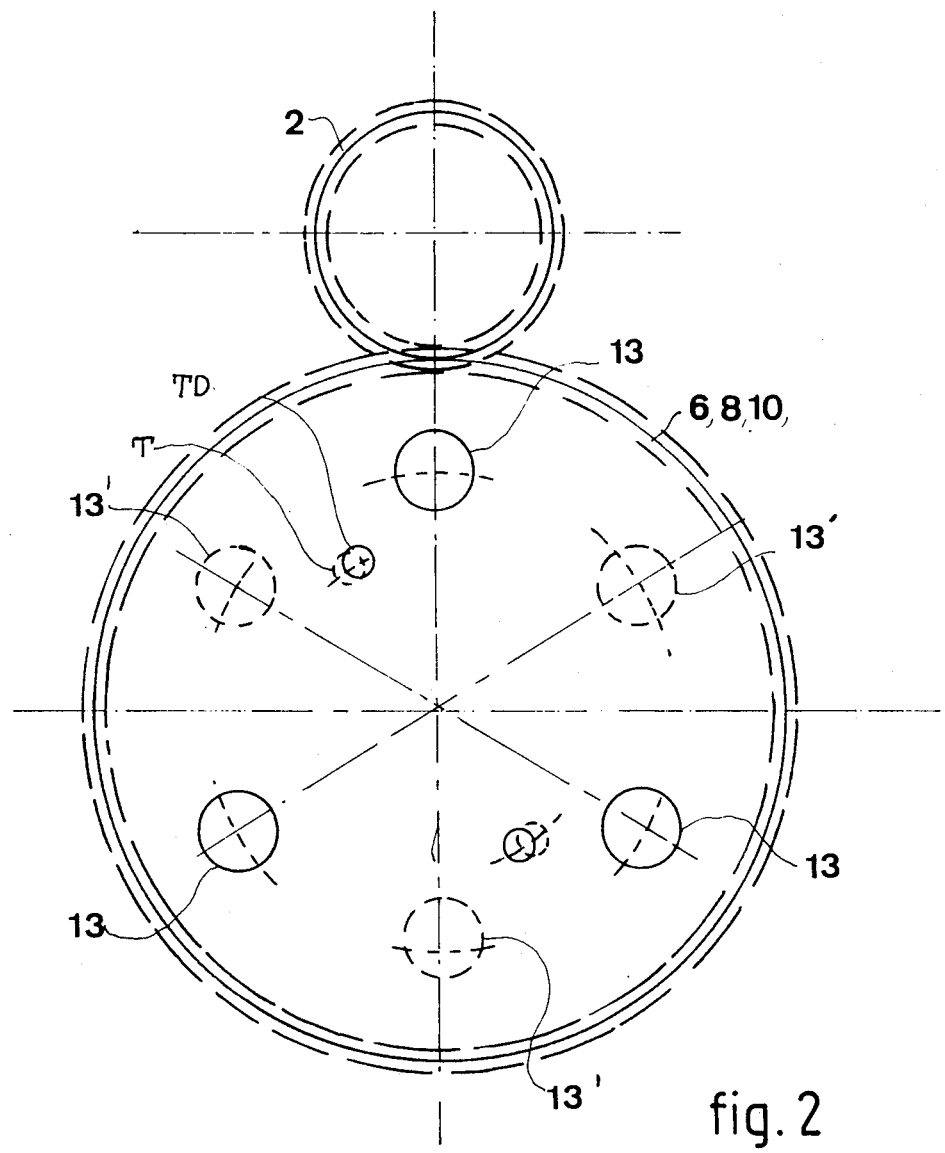
FIG. 2 is a front view of the device shown in FIG. 1.

The gear wheel 6 is connected in rotation with the toothed wheel 8 by means of a series of pegs or tabs 13 made of resilient material and evenly distributed around the shaft 5 (as can be seen in FIG. 2) in order to avoid any unbalance. There are three tabs 13 in the embodiment shown, but this number is not essential.

Similarly, the gear wheel 6 is connected in rotation with the toothed wheel 10 by means of a series of tabs or pegs 13' identical to the tabs 13.

The pegs or tabs 13 and 13' are made of elastically deformable material such as natural or synthetic rubber, plastic material, etc., so as to have a suitable degree of rigidity and of elasticity. For example, the pegs could be tubular in shape (as shown) having an inner metal sleeve 14 covered in a resilient layer 16 which is itself clad by two short metal sleeves 15 having end flanges resting against a middle rib 17 of resilient material which ensures that a gap remains between the metal sleeves 15.

Each peg 13 or 13' is force-fitted in two facing holes through the gear wheel 6 and one or other of the toothed wheels 8 and 10. Each of the tabs 13 or 13' is subjected to resilient pre-stress which may result from the shape given to the tab, such that in the rest state the tab is curved lengthwise, or else by putting the parts under tension after they have been assembled, for example by means of a conical screw engaged in two offset tapped holes made through the gear wheel and the toothed wheel in question.

Figure 5:
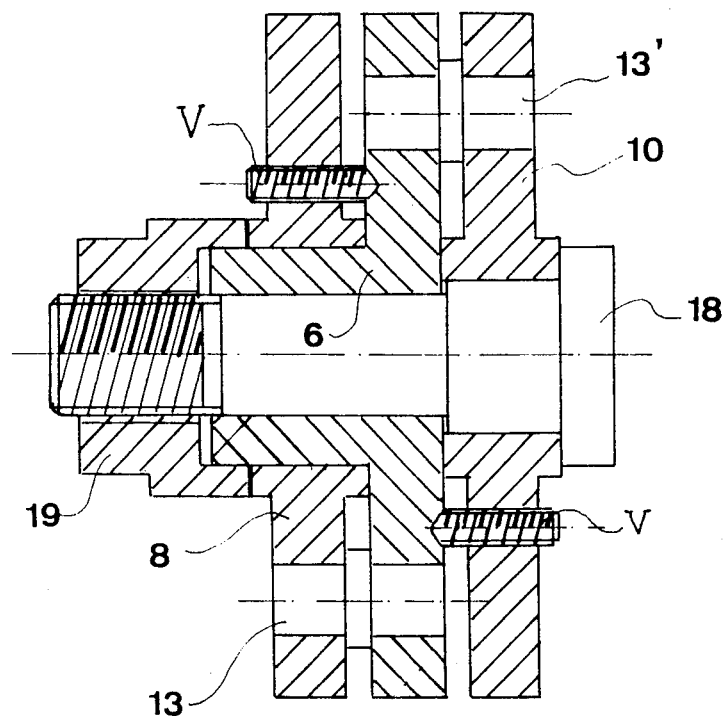
FIG. 5 shows a stage in the manufacture of a device in accordance with the invention.

Thus, the system in accordance with the invention may be manufactured using the process which is shown in part in FIG. 5. In a first stage, the gear wheel 6 is locked on the shaft 18 prior to cutting the teeth therein. The wheels 8 and 10, also prior to having teeth cut therein, are then placed on either side of the gear wheel 6 and a nut 19 is used to fix them temporarily relative thereto both axially and in rotation.

Facing holes for receiving the tabs 13 and 13' are then drilled and the tabs are inserted in said holes. The tabs are then put under stress causing the toothed wheels 8,10 to be offset through a small angle relative to the gear wheel 6, with the two toothed wheels 8,10 being offset in opposite directions. This may be done by screwing screws V through respective tapped holes TD in the toothed wheels 8 or 10 and into holes T made in the gear wheel 6 and offset angularly from the corresponding holes TD by the desired amount.

Naturally the screws V are only used during assembly and are subsequently removed when the system is in operation. While the screws are in place and the tabe are still under stress, the teeth on the gear wheel 6 and on the toothed wheels 8 and 10 are cut simultaneously.

Figure 3:
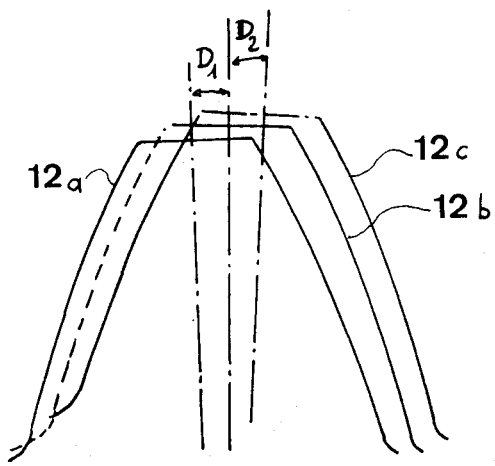
FIG. 3 is a detail on a larger scale showing the offset between the teeth of the toothed wheels and the teeth of a gear wheel.

The screws V are then removed and the resilient action of the tabs 13 and 13' causes the teeth to shift relative to one another as shown in FIG. 3, where 12b represents a tooth of the gear wheel 6, 12a represents the corresponding tooth on the toothed wheel 8, and 12c represents the corresponding tooth on the toothed wheel 10. As can be seen, the tooth 12a is offset through an angle D1 anti-clockwise from the tooth 12b, and the tooth 12c is offset through an angle D2 clockwise from the tooth 12b.

Figure 4:
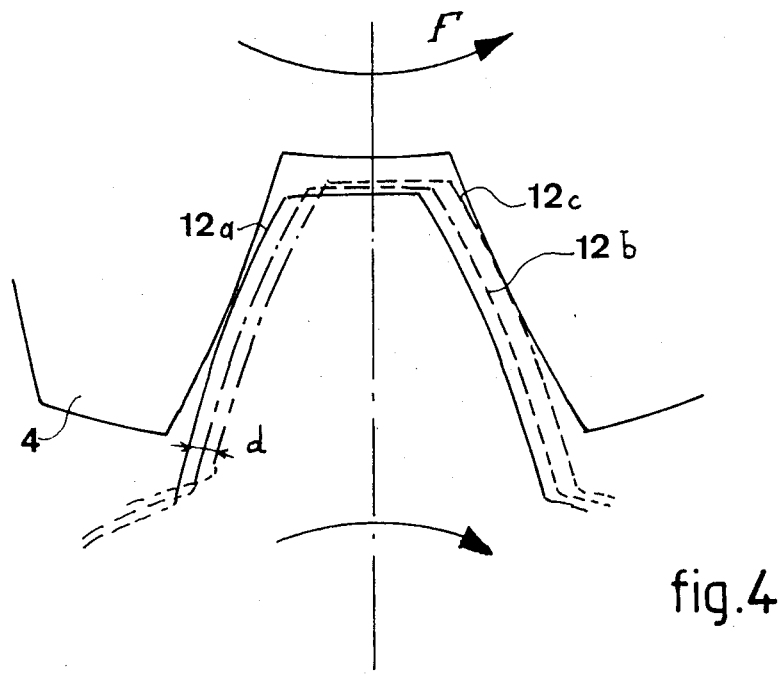
FIG. 4 is a detail showing the device in operation.

In operation, the teeth are placed as shown in FIG. 4. When the teeth 4 of the drive gear wheel rotate in the direction of arrow F, the teeth 4 come into contact with the teeth 12b of the gear wheel 6 and thereby positively drive the shaft 5. The tooth 12a is meanwhile pushed back against the resilient action of the tabs 13. Conversely, the tooth 12c is urged by its tab 13' to come into contact with the following tooth 4 on the drive gear wheel, thereby taking up the backlash between the gear wheels 2,6.

If the direction of rotation is reversed, the opposite disposition is obtained.

Figure 6:
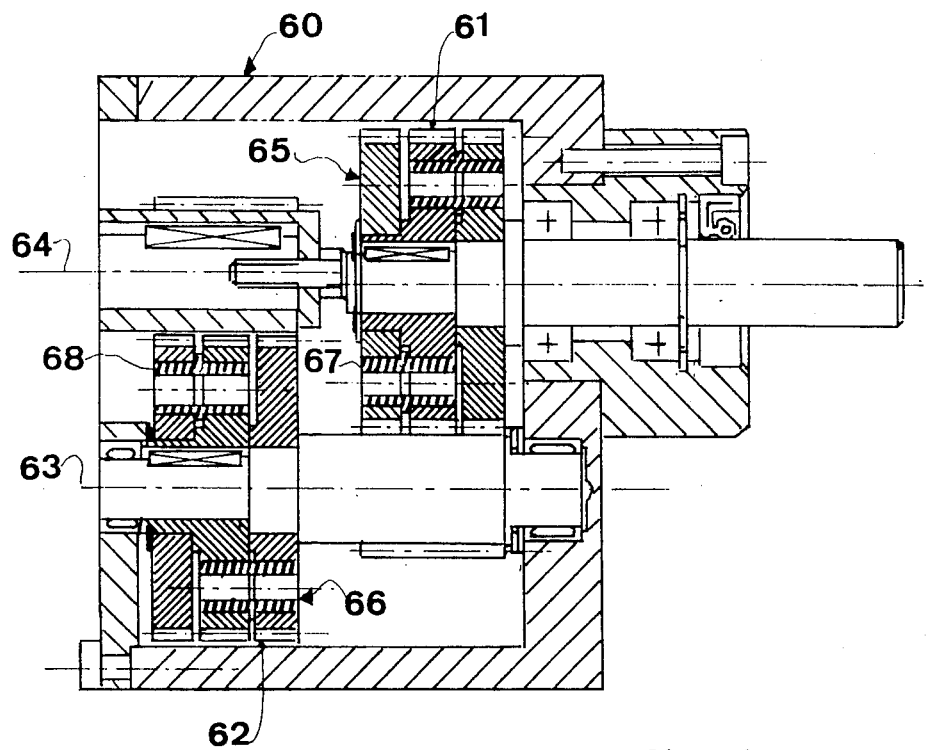
FIG. 6 is an axial section through a two-stage step-down transmission system fitted with two devices in accordance with the invention.

A backlash takeup device in accordance with the invention is applicable to all kinds of gear transmission. By way of example, FIG. 6 shows a stepdown transmission 60 comprising two stages 61 and 62 for coupling two shafts 63 and 64 with a predetermined gear ratio, for example for controlling very accurate and backlash-free displacement of a robot arm. Each of the stages 61 and 62 includes its own backlash takeup device 65 or 66 by resilient pegs or tabs 67,68 as described herein in accordance with the invention.

Figure 7A:
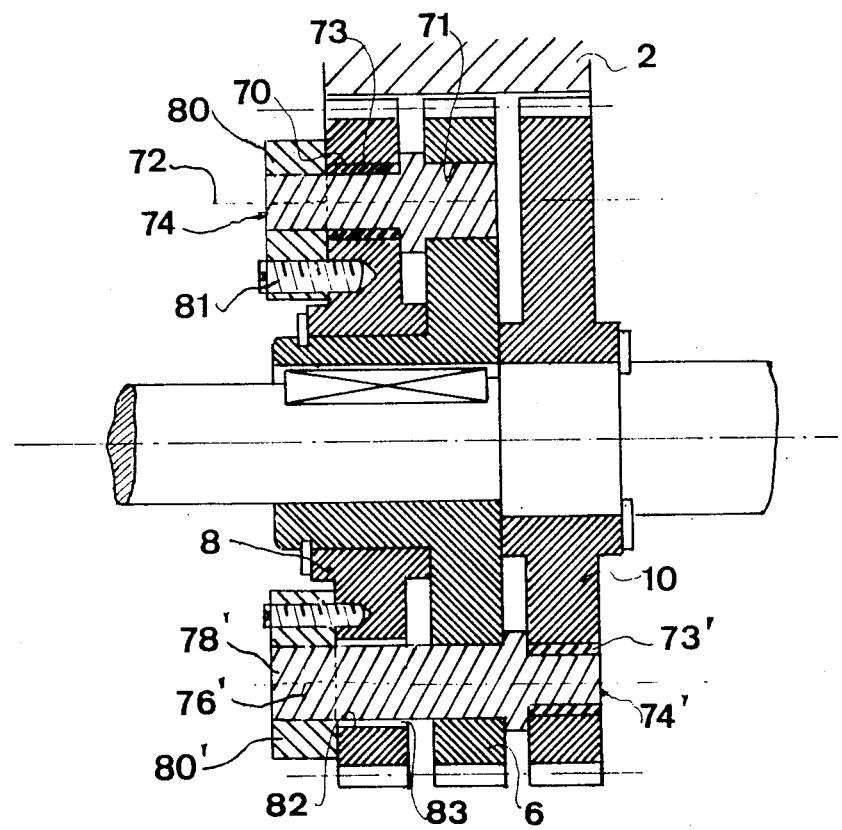
FIGS. 7A and 7B are diagrams of a second and particularly advantageous device in accordance with the invention for automatically taking up backlash.
Figure 7B:
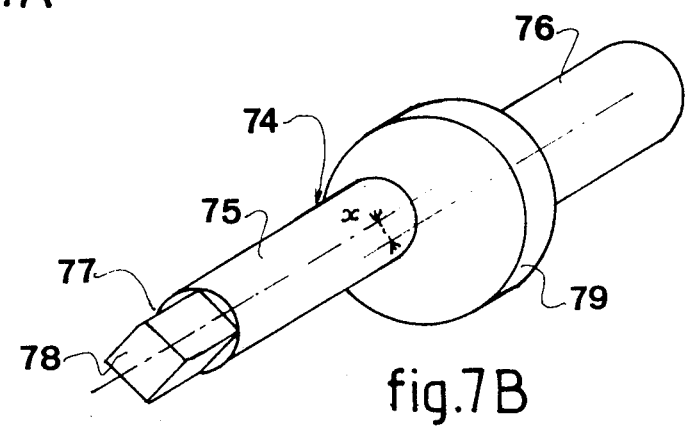

FIGS. 7A and 7B show a particularly advantageous disposition of the automatic backlash takeup device for gear transmissions, and more particularly it shows a particularly advantageous structure for the pegs (or tabs) 13, 13' whose function is to resiliently offset the two toothed wheels 8 and 10 relative to the gear wheel 6, and in opposite directions.

In this embodiment, the toothed wheel 8 and the gear wheel 6 have respective orifices 70 and 71 passing therethrough along a common axis 72 (see FIG. 7A). The orifice 70 through the toothed wheel 8 has a sleeve 73 of resilient material therein, e.g. a composite material. A two-part shaft 74 (see FIG. 7B) is then placed in these two orifices. The two-part eccentric shaft 74 comprises two eccentric shafts 75 and 76 whose axes are offset by a distance x, with the shaft 75 having the same diameter as the inside diameter of the sleeve 73 and the shaft 76 having the same diameter as the inside diameter of the orifice 71. It should be observed that the end 77 of the two-part eccentric shaft 74 has a locking square 78. Advantageously, a shoulder 79 is provided between the two eccentric shafts 75 and 76 and is suitable for placing between the gear wheel 6 and the toothed wheel 8.

In this case, the two-part shaft 74 is located in its two orifices during assembly, with the shoulder lying between the toothed wheel 8 and the gear wheel 6. The shaft 75 is in the sleeve 73 and shaft 76 is in the orifice 71 through the gear wheel 6. The two-part shaft is then rotated, e.g. through 180°, in order to shift the toothed wheel 8 relative to the gear wheel 6 by resiliently deforming the sleeve 73. As a result, the toothed wheel 8 is offset relative to the gear wheel 6 in the same manner as described above. Naturally, a back plate 80 is then used to hold the locking square 78 prisoner in order to keep the two-part shaft 74 in a fixed position and thus keep the toothed wheel 8 in a fixed angular position relative to the gear wheel 6. The back plate 80 is fixed to the toothed wheel 8 by any suitable means, e.g. by means of a screw 81.

This system is entirely satisfactory since, in addition, it makes it possible to adjust the angular position of the two toothed wheels 8 and 10 relative to the gear wheel 6 from a single side of the assembly. As can be seen in FIG. 7A, the toothed wheel 8 is positioned relative to the gear wheel 6 by means of the locking square projecting from the wheel 8 and fixed to the shaft 75 which co-operates with the sleeve 73. However, a second two-part shaft 74' for positioning the toothed wheel 10 relative to the gear wheel 6 has its shaft 76' passing through an orifice 82 of suitable play 83 in the wheel 8 and the locking square 78' then co-operates with a back plate 80' which is also fixed to the wheel 8.

I claim:

1. A device for automatically taking up backlash in a gear transmission including at least one drive shaft and at least one driven shaft which are interconnected by first and second meshing gear wheels, the device comprising first and second toothed wheels mounted on either side of said first meshing gear wheel, on the same shaft as said first meshing gear wheel, and having the same diameter and the same number of teeth as said first gear wheel in order to mesh with said second gear wheel, said first and second toothed wheels being free to rotate about said shaft and each toothed wheel being connected to said first gear wheel by respective resilient coupling means extending parallel to said shaft, and means for placing said resilient coupling means under a pre-stress such that when the teeth of said toothed wheels and said first gear wheel are substantially aligned for meshing with said second gear wheel, one of said toothed wheels is resiliently urged clockwise and the other of said toothed wheels is resiliently urged anti-clockwise about said shaft and relative to said first gear wheel, and when the teeth are not meshed and said resilient coupling means are allowed to relax, said means for placing said coupling means under pre-stress causes said toothed wheels to be angularly offset in opposite directions relative to said first gear wheel.

2. A device according to claim 1, wherein the resilient coupling means are constituted by resilient pegs and said resilient pre-stress means acts on the pegs of one of the toothed wheels to offset said toothed wheel in one direction of rotation and on the pegs of the other toothed wheel in the opposite direction.

3. A device according to claim 1, wherein the resilient coupling means are constituted by resilient pegs in the form of cylindrical tabs which are force-fitted in corresponding holes in said first gear wheel and in one and the other of the toothed wheels.

4. A device according to claim 1, wherein each toothed wheel is coupled to said first gear wheel by a plurality of uniformly spaced coupling means.

5. A device according to claim 1, wherein said resilient coupling means are constituted by resilient pegs which, in operation, are elastically deformed in the lengthwise direction.

6. A device according to claim 1, wherein said resilient coupling means are constituted by pairs of orifices, one orifice of each pair being made through a toothed wheel and the other orifice of each pair being made through said first gear wheel, each pair of orifices receiving a two-part shaft comprising two eccentric shafts which are interconnected end-to-end by a shoulder which is located between the corresponding toothed wheel and said first gear wheel, a sleeve being disposed in each of said orifices made through a toothed wheel, said two-part shaft having its two shafts respectively situated in said sleeve and in said orifice through said gear wheel, and means for locking said two-part shaft relative to said toothed wheel.

7. A device according to claim 6, wherein the resilience of said resilient couplings is provided by said sleeves being made of resilient composite material.

* * * * *